(12) United States Patent
Madineni et al.

(10) Patent No.: US 11,809,602 B2
(45) Date of Patent: Nov. 7, 2023

(54) PRIVACY VERIFICATION FOR ELECTRONIC COMMUNICATIONS

(71) Applicant: International Business Machines Corporation, Armonk, NY (US)

(72) Inventors: Narayana Aditya Madineni, Southport (AU); Pranab Agarwal, Oxenford (AU); Chia-Le Cheng, Southport (AU); Shane Nicholas Cress, Wendouree (AU)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 17/009,858

(22) Filed: Sep. 2, 2020

(65) Prior Publication Data

US 2022/0067211 A1    Mar. 3, 2022

(51) Int. Cl.
    *G06F 21/62*      (2013.01)
    *H04L 9/40*      (2022.01)
    *H04L 51/046*      (2022.01)
    *H04M 1/27457*      (2020.01)
    *H04L 51/214*      (2022.01)

(52) U.S. Cl.
    CPC ........ *G06F 21/6263* (2013.01); *H04L 51/046* (2013.01); *H04L 51/214* (2022.05); *H04L 63/0236* (2013.01); *H04L 63/101* (2013.01); *H04M 1/27457* (2020.01)

(58) Field of Classification Search
    CPC ........... G06F 21/6263; H04M 1/27457; H04L 51/14; H04L 51/046; H04L 63/0236; H04L 63/101
See application file for complete search history.

(56) References Cited

U.S. PATENT DOCUMENTS

| | | | |
|---|---|---|---|
| 8,103,724 B2 | 1/2012 | Dawson et al. | |
| 8,224,924 B2 * | 7/2012 | Andersen | G06Q 10/10 709/217 |
| 8,370,948 B2 | 2/2013 | Troyansky | |
| 9,015,252 B2 | 4/2015 | Ryan et al. | |
| 9,501,744 B1 | 11/2016 | Brisebois et al. | |
| 10,453,034 B2 | 10/2019 | Jones et al. | |

(Continued)

OTHER PUBLICATIONS

"Methodology to protect sensitive data before forwarding / replying emails", An IP.com Prior Art Database Technical Disclosure, IP.com Disclosure No. IPCOM000190151D, Original Publication Date: Nov. 18, 2009, 3 pages.

(Continued)

*Primary Examiner* — Sargon N Nano
(74) *Attorney, Agent, or Firm* — Scott S. Dobson

(57) ABSTRACT

Electronic communication privacy verification is provided. An electronic communication associated with a set of addresses is received. The electronic communication is analyzed using an artificial intelligence model to classify a purpose for the electronic communication. Using an authorization database, it is determined whether each address in the set of addresses has been authorized for communication for the classified purpose. In response to determining at least one address has not been authorized for communication for the classified purpose, a sender of the electronic communication is prompted to remove the at least one address.

20 Claims, 8 Drawing Sheets

(56) References Cited

U.S. PATENT DOCUMENTS

| | | | |
|---|---|---|---|
| 10,803,198 B2* | 10/2020 | Barday | G06F 21/6245 |
| 11,025,675 B2* | 6/2021 | Barday | G06Q 10/10 |
| 2009/0094668 A1 | 4/2009 | Corbin et al. | |
| 2010/0229246 A1 | 9/2010 | Warrington et al. | |
| 2012/0005720 A1* | 1/2012 | McGloin | G06F 21/6263 |
| | | | 726/1 |
| 2014/0344343 A1* | 11/2014 | Zarkesh | H04L 63/0227 |
| | | | 709/203 |
| 2015/0074771 A1* | 3/2015 | Goldberg | H04L 63/101 |
| | | | 726/4 |
| 2015/0271666 A1* | 9/2015 | Arunachalam | H04L 63/20 |
| | | | 455/410 |
| 2015/0312277 A1* | 10/2015 | Rane | G06F 21/6218 |
| | | | 726/1 |
| 2016/0092885 A1* | 3/2016 | Creager | G06Q 30/0635 |
| | | | 705/317 |
| 2017/0070539 A1* | 3/2017 | Sachs | H04W 12/02 |
| 2018/0219818 A1* | 8/2018 | Kramer | H04L 51/28 |
| 2019/0050595 A1* | 2/2019 | Barday | H04L 63/0236 |
| 2019/0260784 A1* | 8/2019 | Stockdale | G06N 20/10 |
| 2020/0272764 A1* | 8/2020 | Brannon | G06F 21/6218 |

OTHER PUBLICATIONS

"System and Method to track recipient inclusion/Exclusion and their participation in a email conversation", An IP.com Prior Art Database Technical Disclosure, IP.com Electronic Publication Date: Sep. 21, 2010, IP.com Disclosure No. IPCOM000199912D, 6 pages.

Mell et al., "The NIST Definition of Cloud Computing", Recommendations of the National Institute of Standards and Technology, Special Publication 800-145, Sep. 2011, 7 pages.

* cited by examiner

PRIVACY VERIFICATION FOR ELECTRONIC COMMUNICATIONS

BACKGROUND

The present disclosure relates to computer aided management of electronic communications, and more specifically, to privacy verification for electronic communications.

Personal information (PI) is information that relates to an identifiable person. Organizations collect PI from individuals for various purposes. To protect the privacy of individuals, organizations must ensure that the PI is used only for authorized purposes and that it is not disclosed in any unauthorized way. Further, organizations must follow applicable data privacy laws and regulations regarding the storage and use of PI.

SUMMARY

According to embodiments of the present disclosure, a computer-implemented method is provided. The method includes receiving an electronic communication associated with a set of addresses. The electronic communication is analyzed using an artificial intelligence model to classify a purpose for the electronic communication. Using an authorization database, it is determined whether each address in the set of addresses has been authorized for communication for the classified purpose. In response to determining at least one address has not been authorized for communication for the classified purpose, a sender of the electronic communication is prompted to remove the at least one address.

Further disclosed herein are a system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
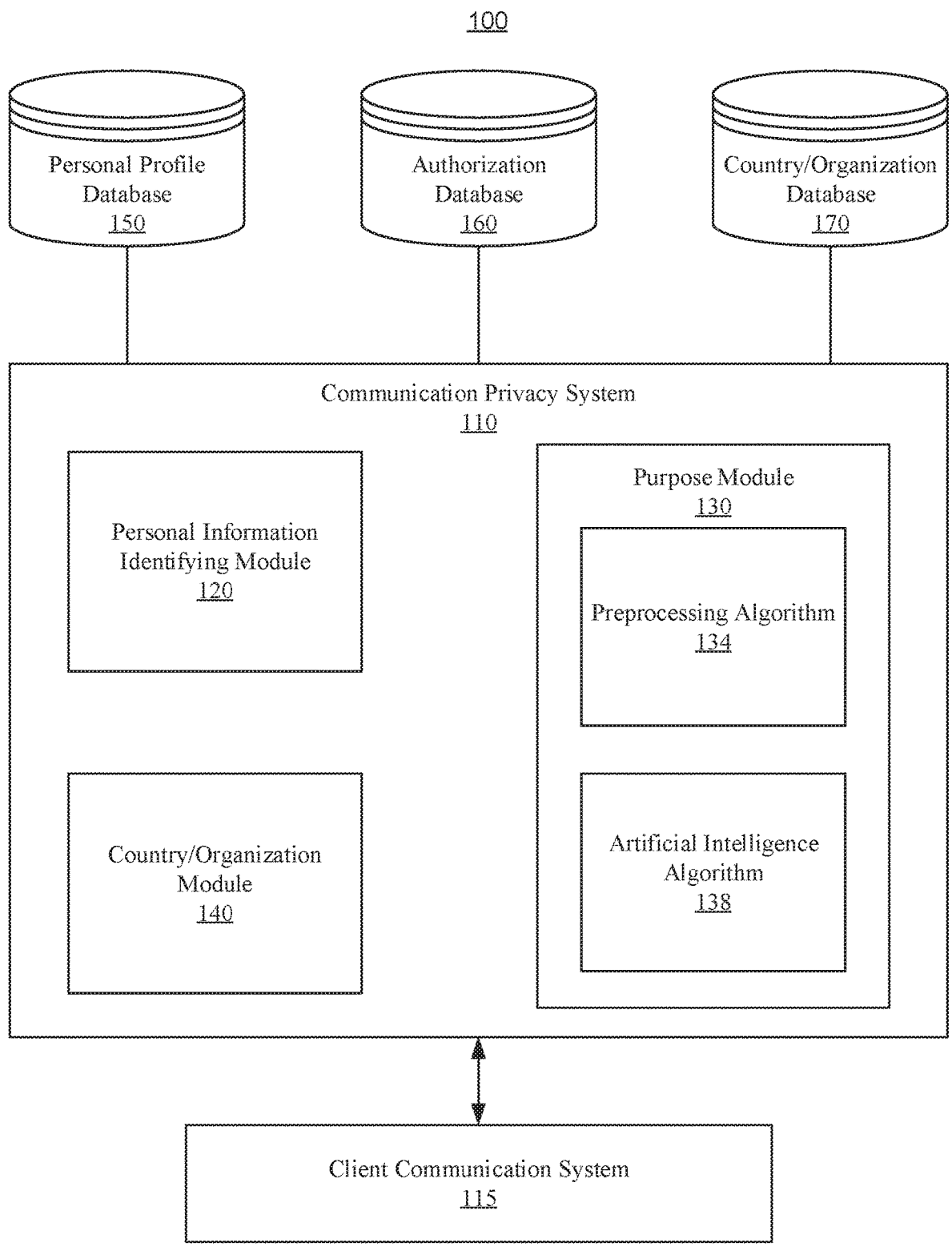
FIG. 1 depicts an example computing environment according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer-implemented personal information privacy for electronic communications, and more particular aspects relate to preventing unauthorized use and disclosure of personal information for electronic communications. While the present disclosure is not necessarily limited to such applications, various aspects of the disclosure may be appreciated through a discussion of various examples using this context.

Organizations send electronic communications to individuals for various purposes including, for example, marketing, promotions, alerts, and notifications. To send these communications, organizations may collect contact information from individuals including, for example, email addresses, telephone numbers, and social media handles for sending electronic communications. Organizations may allow individuals to limit the use of their contact information to specific purposes. For example, an individual may be asked to opt in or out of the use of their contact information for a variety of specific purposes. Alternatively, an individual may provide contact information in response to a request to provide contact information for one or more specific purposes.

As used herein, the term "electronic communication" may refer to any form of electronic communication including, but not limited to, electronic mail (email), short message service (SMS), and social media messaging.

As used herein, the term "address" may refer to any contact information used to address an electronic communication to an entity. Example addresses include email addresses, phone numbers, and social media handles. Addresses associated with an electronic communication may include addresses to which the communication is addressed. For example, addresses associated with an email may include email addresses listed in the "To:", "Cc:", and "Bcc:" fields of the email header.

As used herein, the term "organization" may refer to any organization that may be sending electronic communications including, for example, businesses, schools, nonprofit organizations, and government organizations.

Embodiments of the present disclosure provide a communication privacy system for protecting the privacy of recipients of electronic communications. The system may prevent a sender of an electronic communication from accidentally violating the privacy of one or more recipients. In some embodiments, the system may be implemented as part of an electronic communication client (e.g., an email client). In some embodiments, the system may be provided within a cloud computing environment.

The system may perform one or more verifications on an electronic communication prior to the communication being sent to recipients. In some embodiments, the system may identify PI in the subject or body of the electronic communication by comparing the subject and body of the communication to information in personal profiles of the recipients. For example, a method such as regular expression (Regex) may be used to identify a match between the electronic communication and a recipient profile. If the communication contains, PI for one or more recipients, the sender may be notified so that they can remove the PI prior to sending the communication.

In some embodiments, the system analyzes the electronic communication to classify a purpose for the communication and verifies that individuals have authorized communication for the classified purpose. The system may store communication authorizations from individuals in an authorization database. In some embodiments, the database may include a table for each relevant communication purpose for the sender's organization, with each table including addresses that have been authorized for the respective purpose. The system may analyze the communication using an artificial intelligence (AI) model to classify the purpose of the communication. The AI model may be trained using supervised learning methods. In some embodiments, the AI model is a recurrent neural network (RNN). The communication may be preprocessed to transform the communication into a format required for inputting into the RNN. The system may classify the purpose of the communication using the output of the AI model. For example, output values of an RNN may each be associated with a specific purpose and output values exceeding a threshold value may be used to classify the purpose of the communication. In some embodiments, the system may classify the communication with more than one purpose.

Once the system classifies the purpose of the communication, the system may reference the authorization database to verify that each recipient of the communication has authorized their address to be used for a communication of the classified purpose. For example, the system may verify that the addresses used in the communication are found in the corresponding table for each classified purpose. If an address is not authorized for communications for a classified purpose (e.g., the address is not listed in the corresponding table), the sender may be notified to allow the sender to remove the address prior to sending the communication.

In some embodiments, the sender may be prompted to verify the classified purpose and to select a different purpose if the classified purpose is incorrect. If the sender identifies a different purpose, the system may update the AI model. For example, the system may perform backpropagation on the neural network using an initial vector corresponding to the sender-identified purpose to update the weights of the neural network. This may allow the AI model to learn and become more accurate over time. The system may also verify that each recipient has authorized communication for the sender-identified purpose.

In further embodiments, the system may determine when recipients of the communication are located in different countries or associated with different organizations than the sender and notify the sender regarding the privacy laws or regulations of the different countries or organizations. The system may identify countries or organizations associated with the recipients in various ways. In some embodiments, the address may provide this information. For example, a company email address may identify the company that a recipient is associated with. In some embodiments, the information may be pulled from a public or private database. For example, the information may be made publicly available over the internet by a different organization, or the sender's organization may store organization or country information for its contacts. If a recipient is in a different country or organization than the sender, the sender may be prompted to check the privacy rules of the country or organization. In some embodiments, the prompt may include the relevant privacy rules. In some embodiments, the system does not prompt the sender if the recipients in different countries or organizations are part of the same team such that there are not privacy concerns for sending communications generally.

In some embodiments, the system may determine whether revealing recipient addresses to other recipients is authorized. For example, the system may determine whether the recipients are part of the same team or organization. If revealing recipient addresses to other recipients is not authorized, the system may notify the sender or take corrective action. In some embodiments, corrective action may include separating the communication into separate communications to each recipient. In some embodiments, corrective action may include moving email addresses in the "To" and "Cc" fields to the "Bcc" field in the header of an email.

Referring now to FIG. 1, an example computing environment 100 is depicted according to embodiments of the present disclosure. Computing environment 100 includes communication privacy system 110, client communication system 115, personal profile database 150, authorization database 160, and country/organization database 170. One or more aspects of computing environment 100 may be provided in a cloud computing environment. For example, Communication Privacy system 110, personal profile database 150, authorization database 160, and country/organization database 170 may be provided in a cloud computing environment in communication over one or more networks with client communication system 115. Communication privacy system 110 and/or client communication system 115 may be implemented using any suitable computing system including, for example, computer system 601 described in reference to FIG. 6. Although communication privacy system 110 and client communication system 115 are depicted as separate systems, they may be part of the same system in some embodiments.

Communication privacy system 110 may be configured to perform PI privacy verifications on electronic communications provided by client communication system 115 using personal profile database 150, authorization database 160 and country/organization database 170. In some embodiments, client communication system 115 is a system with an email client for sending emails to recipient email addresses. Client communication system 115 may provide electronic communications to communication privacy system 110 prior to sending the communications to the recipients. For example, an email client may provide an email to the communication privacy system when a user clicks a button to send the email instead of immediately sending the email to the recipient email addresses.

Communication privacy system 110 includes PI identifying module 120, purpose module 130, and country/organization module 140. PI identifying module 120 may be configured to identify personal information in communications by comparing the communication content to recipient profile information in personal profile database 150. Purpose module 130 may be configured to classify the purpose of a communication by applying preprocessing algorithm 134 and artificial intelligence algorithm 138 and determine whether the recipients of the communication have authorized communications for the classified purpose using authorization database 160. Country/organization module 140 may be configured to determine whether the recipients of the communication are from a different country or part of a different organization than the sender of the communication. Although described with distinct systems, modules, and databases, it should be understood that, in at least some embodiments, these components may be combined or divided, and/or additional components may be added without departing from the scope of the present disclosure.

Figure 2:
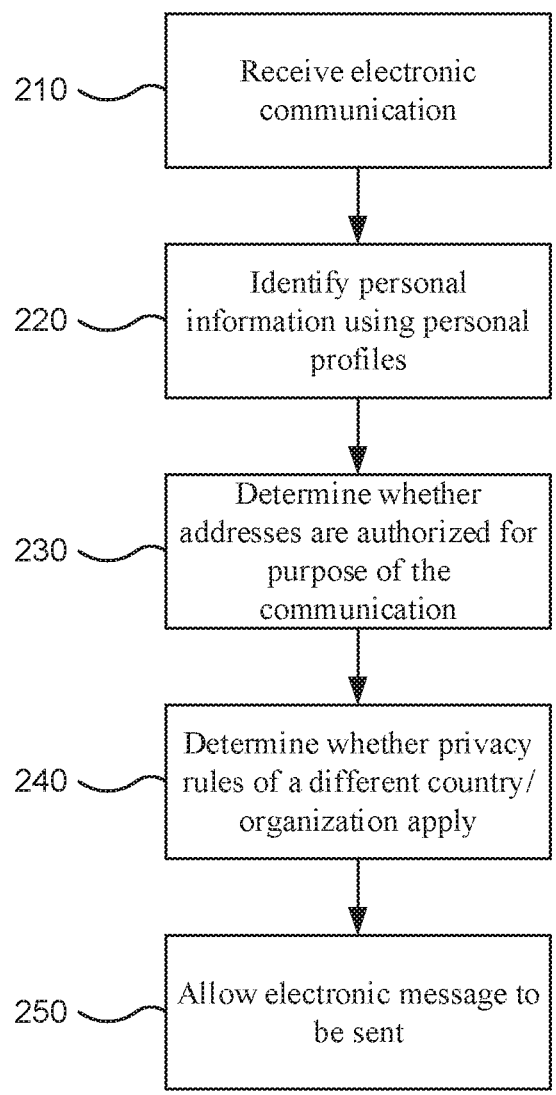
FIG. 2 depicts a flowchart of an example method for performing personal information privacy verification according to embodiments.

Referring now to FIG. 2, a flowchart of an example method 200 for performing PI privacy verification is depicted according to embodiments. Method 200 may be performed by communication privacy system 110 described in reference to FIG. 1. At operation 210, the communication privacy system receives an electronic communication. The electronic communication may be received from a separate computing system over one or more networks such as, for example, client communication system 115 described in reference to FIG. 1. The client communication system may be configured to provide the communication to the communication privacy system when the communication is ready to be sent to the recipients.

For example, a user of the client communication system may draft an email to send to several email addresses. When the user clicks the send button to send the email, the client communication system may provide the communication to the communication privacy system to perform privacy verification on the email prior to sending the email.

Figure 3:
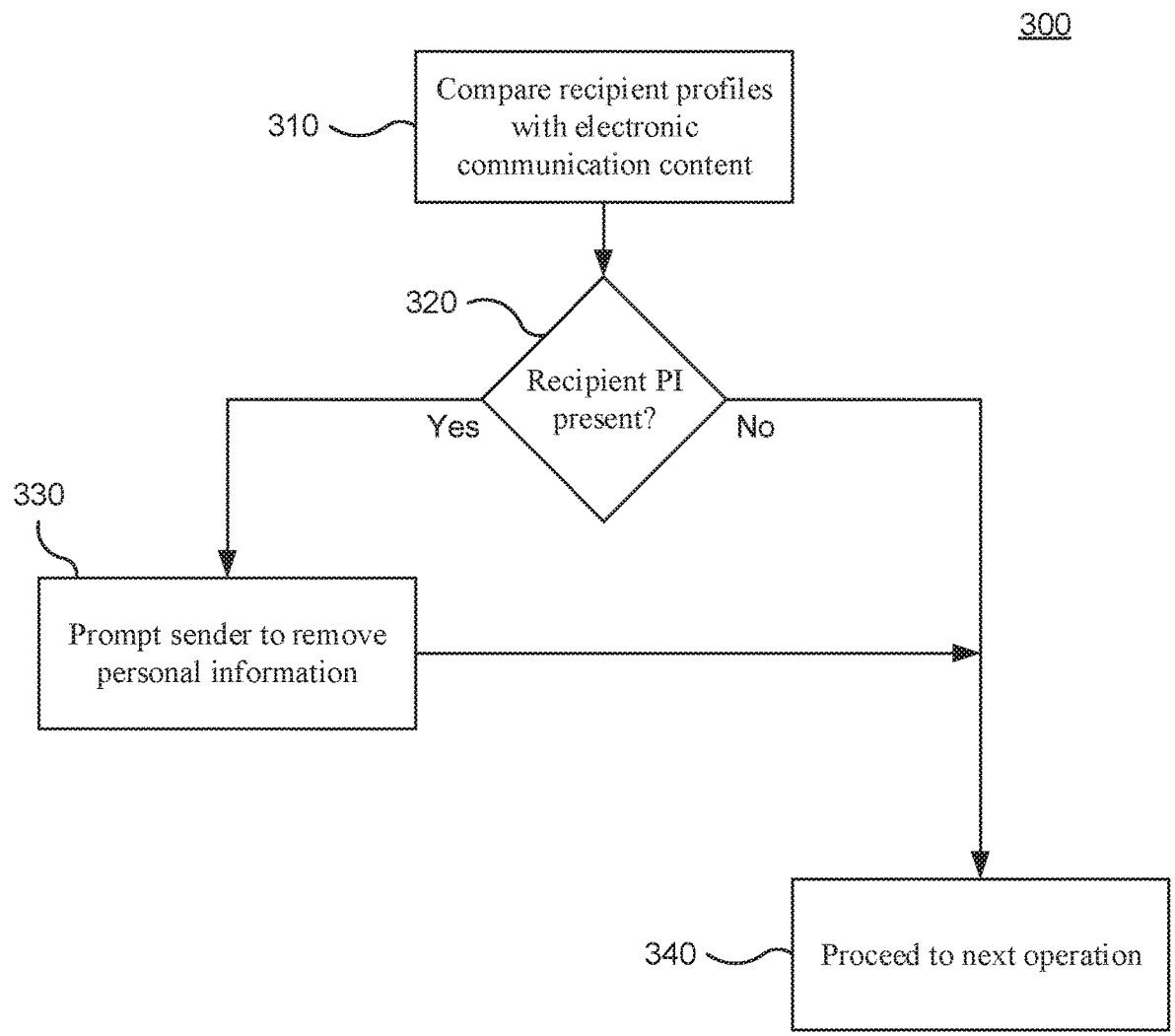
FIG. 3 depicts a flowchart an example method for identifying personal information in an electronic communication according to embodiments.

At operation 220, the communication privacy system may identify PI in the electronic communication. Operation 220 may be performed by PI identifying module 120 described in reference to FIG. 1. An example flowchart of operation 220 is depicted in FIG. 3.

Figure 4:
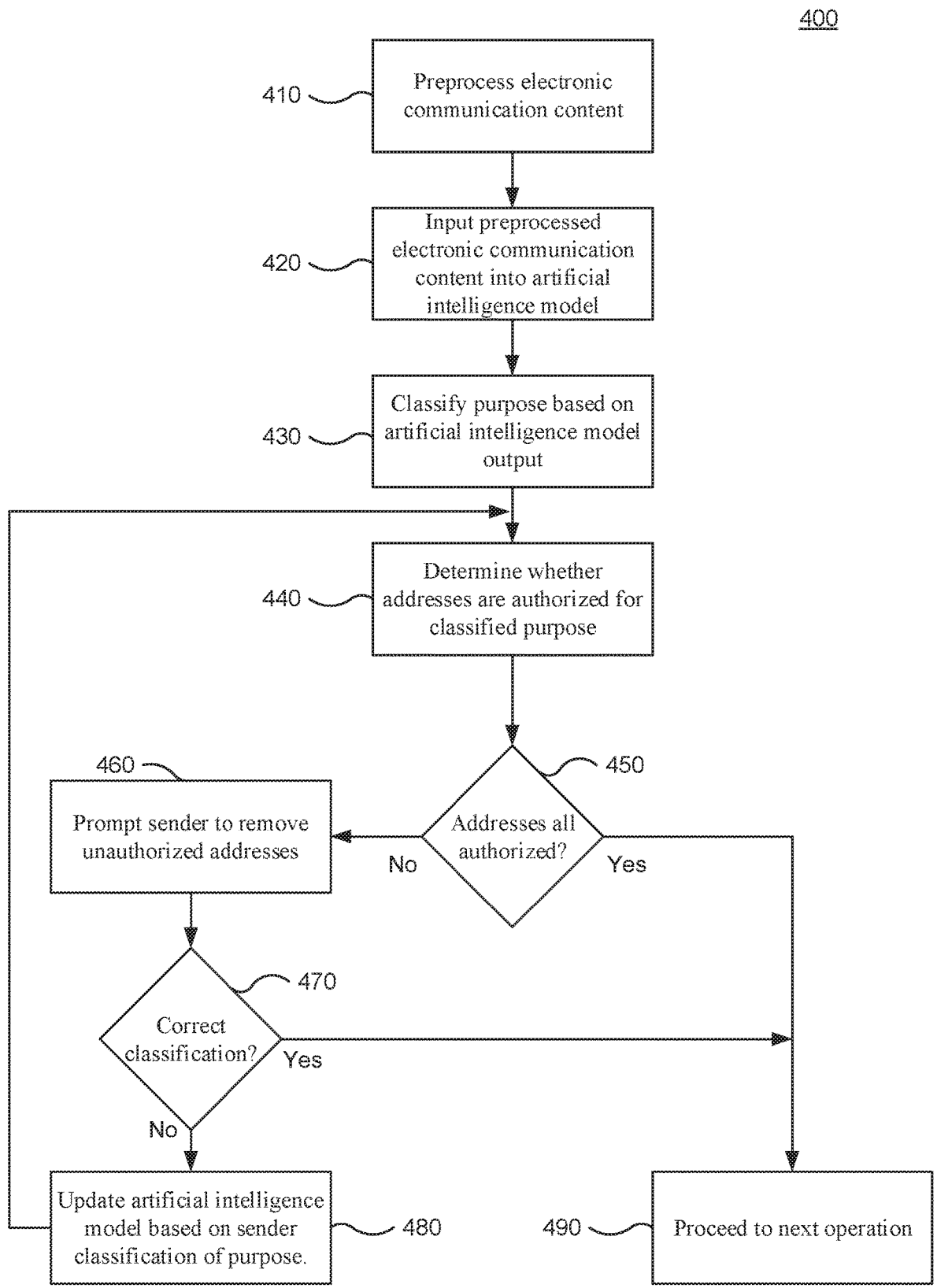
FIG. 4 depicts a flowchart of an example method for determining whether addresses are authorized for the purpose of an electronic communication according to embodiments.

At operation 230, the communication privacy system may determine whether the recipient addresses in the communication are authorized for the purpose of the communication. Operation 230 may be performed by purpose module 130 described in reference to FIG. 1. An example flowchart of operation 230 is depicted in FIG. 4.

Figure 5:
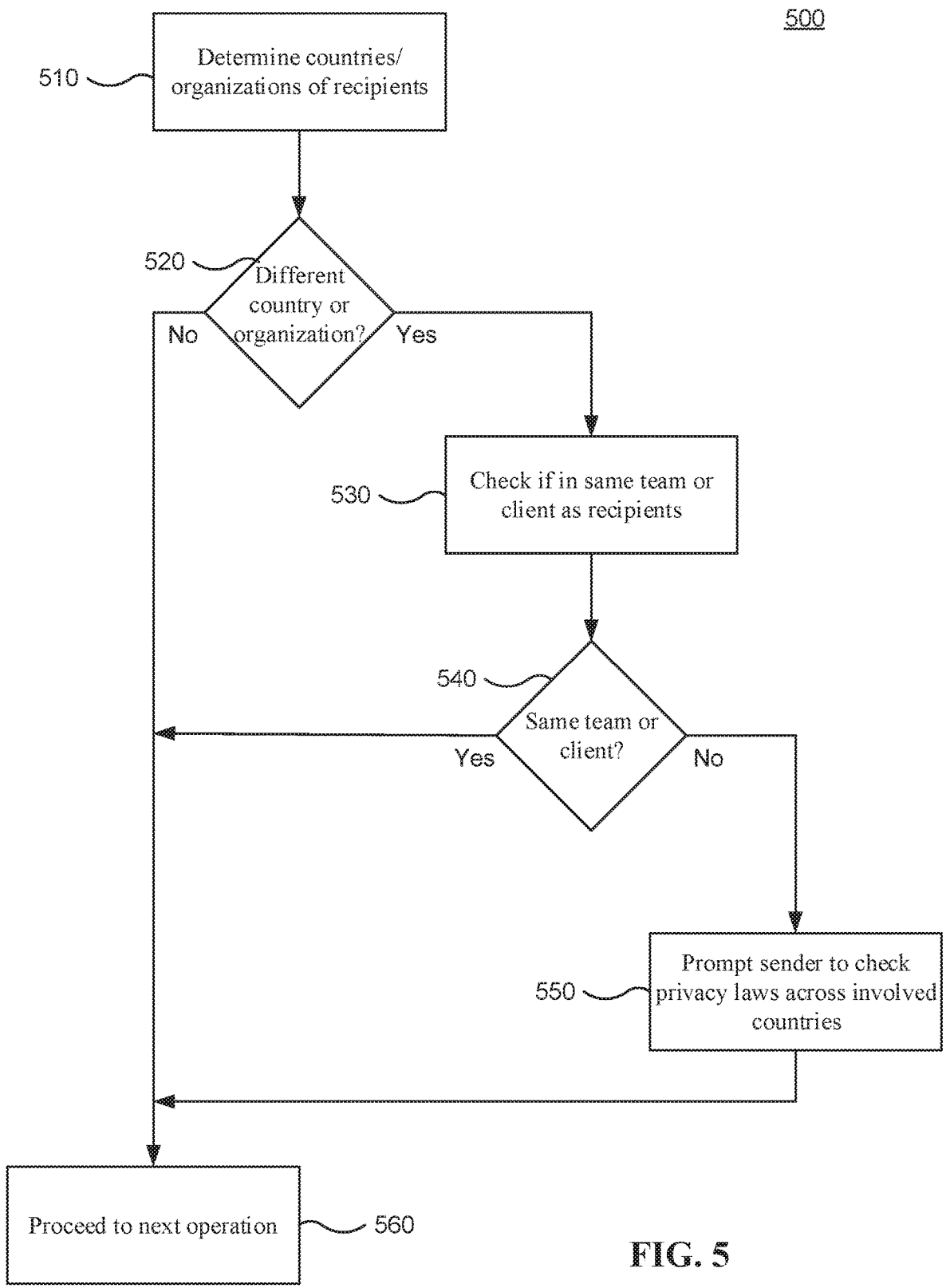
FIG. 5 depicts a flowchart of an example method for determining whether privacy rules of a different country or organization apply to an electronic communication according to embodiments.

At operation 240, the communication privacy system may determine whether privacy rules for a different country or organization apply to the communication based on the recipients. Operation 240 may be performed by country/organization module 140 described in reference to FIG. 1. An example flowchart of operation 240 is depicted in FIG. 5.

At operation 240, the communication privacy system may allow the communication to be sent to the recipients. In some embodiments, the communication privacy system instructs the client communication system to proceed with sending the communication to the recipients. In some embodiments, the communication privacy system may send the communication to the recipients over one or more networks.

In some embodiments, operations 220, 230, and 240 may be performed in a different order. In some embodiments, only one or two of operations 220-240 are performed.

Referring now to FIG. 3, a flowchart an example method 300 for identifying PI in an electronic communication is depicted. Method 300 may be performed by communication privacy system 110, and more specifically PI identifying module 120, described in reference to FIG. 1.

At operation 310, the communication privacy system may compare recipient profiles with the content of the electronic communication. Personal profiles may be stored in a database locally or may be accessed over one or more networks. In some embodiments, the personal profiles may be company profiles for employees. In some embodiments, PI from each recipient profile may be used to generate a search string to perform a search on the subject and/or body of the electronic communication. In some embodiments, natural language processing may be used to identify potential PI in the electronic communication and the communication privacy system may search the recipient profiles for the potential PI. In some embodiments, a method such as regular expression (Regex) may be used to identify a match between the electronic communication and a recipient profile.

At operation 320, the communication privacy system may determine whether the communication contains PI of the recipients based on the comparison in operation 310. If the communication contains PI of the recipients, the communication privacy system may prompt the sender to remove the PI from the email at operation 330. In some embodiments, the communication privacy system may instruct the client communication system to provide a prompt to the sender. For example, the communication privacy system may instruct an email client on the client communication system to display a message notifying a user of the email client of the PI contained in an email. Alternatively, in some embodiments, the communication privacy system may remove the PI from the communication.

After prompting the sender to remove PI or if there is no PI present in the communication, at operation 340 the communication privacy system may proceed to the next operation. In some embodiments, the next operation may be another PI privacy verification such as operation 230 or operation 240 described in reference to FIG. 2. In some embodiments, the next operation may be allowing the electronic message to be sent to the recipients such as in operation 250 described in reference to FIG. 2.

Referring now to FIG. 4, a flowchart of an example method 400 for determining whether addresses are authorized for the purpose of an electronic communication is depicted. Method 400 may be performed by communication privacy system 110, and more specifically purpose module 130, described in reference to FIG. 1.

At operation 410, the communication privacy system may preprocess the electronic communication content to transform the communication into a format required for inputting into an artificial intelligence model. In some embodiments, the preprocessing of the communication includes the following steps:

1. Remove any special characters from the given string which forms the communication content.
2. Remove stop words such as "is", "the", "of", etc.
3. Perform stemming on words to transform each word to its root word (e.g., running becomes run).
4. Convert all letters to lowercase.
5. Perform word embedding to convert all words to numerical representations.
6. Trim or pad vector length to match number of nodes in the input layer of the artificial intelligence model.
7. Output the final form of the word vector.

At operation 420, the communication privacy system may input the preprocessed electronic communication content into the artificial intelligence model. In some embodiments, the artificial intelligence model is an artificial neural network. A word vector generated by preprocessing the electronic communication may be input into the input layer of the artificial neural network.

In some embodiments, the artificial neural network is a recurrent neural network (RNN) that has been trained using supervised learning methods. A large volume of labeled emails may be used to train the RNN. For example, the RNN may be trained by performing the following steps:

1. Take batch of training data samples, such as a batch of 64 samples, and stack them into a matrix of values.
2. Perform a matrix multiplication of the first column of words representing first email in the training data against the first layer of weights leading to the first hidden layer of the network.
3. Perform a summation at each node/neuron in the first hidden layer to create a matrix of summations for each sample where each cell of the matrix represents the sum of products resulting from the multiplication of a word value against all the weights leading to this node/neuron.
4. Apply an activation function on each cell of the matrix such as the Sigmoid or RELU activation functions to 'squash' the values of the summations to values between 0 and 1.
5. Perform steps 2 through 4 for each hidden layer.
6. Output the final value for the vector of words inserted, then loop back the matrix of final values to input with the next vector for the next set of words in each sample of the batch.
7. Once all samples in the batch have been exhausted, output the final classifications for each sample, in this case 64 classifications.
8. Test each output classification against the real classifications provided as labels for each sample to find the amount of error between the predicted values and the real values.
9. Find the amount of error each weight in the previous layer contributed to the final error.
10. Adjust each weight according to their amount of error identified in the previous step by using gradient descent.
11. Find the amount of error each weight in the layers behind the final hidden layer contributed to the final error by using a variation of the equation.
12. Using the error found in the previous step for each weight in the hidden layers, apply gradient descent to update the weight.
13. Repeat steps 1 through 12 until Epoch complete, where an Epoch is an iteration over all the training data before performing the next iteration.

The artificial intelligence model may process the preprocessed communication content to generate an output. For example, a trained RNN may output a vector with each value being associated with a given purpose. In some embodiments, a trained RNN may process the preprocessed communication input using the following steps:
1. A word vector which has been preprocessed is input to the initial input layer of the RNN one word at a time.
2. The numerical value which represents the word is multiplied against the first layer of weights going to the first hidden layer of the network
3. The resulting vector of products from each multiplication of the input value against each individual weight value is summed at each node/neuron of the hidden layer.
4. The summed value at each node/neuron has an activation function applied such as the Sigmoid function or RELU function, which 'squashes' the value to a value between 0 and 1.
5. For each hidden layer, repeat the steps 2 through 4 using the output of each node/neuron.
6. The final output value from the last layer is looped back and added to the next word input, and this is repeated for every word until the word vector is exhausted.

At operation 430, the communication privacy system may classify the purpose of the communication based on the output of the artificial intelligence model. In some embodiments, the communication privacy system is programmed with a plurality of available classifications. The available classifications may be based on the particular sender or organization of the sender. Classifications may vary in scope across different embodiments. For example, in some embodiments, classifications may include more general classifications such as marketing, personal, business, and other. In other embodiments, the classifications may be more specific such as marketing material related to cloud computing, marketing material related to cognitive applications, cloud computing sales, and cognitive application sales.

The output of the artificial intelligence model may include a plurality of values with each value indicating the likelihood of the communication having a given purpose. For example, the output of an RNN may be [0.4, 0.1, 0.5, 0.0] corresponding to the available classifications are [marketing, personal, business, other]. In some embodiments, the value indicating the highest likelihood (e.g., the largest value) may be used to classify the purpose. Thus, using the example above, the communication would be classified as "business" because the associated value of 0.5 is the highest. In some embodiments, a threshold value may be used to classify the purpose and the communication privacy system may classify a communication with multiple purposes if multiple values exceed the threshold. Using the example above, if the threshold value is 0.3 the communication would be classified as both "marketing" and "business."

At operation 440, the communication privacy system may determine whether the recipient addresses are authorized for the classified purpose. In some embodiments, the communication privacy system may maintain a database with authorizations for communications such as authorization database 160 described in reference to FIG. 1. The communication privacy system may store the authorized addresses by purpose. For example, a separate table may be stored for each available purpose with each table including a list of addresses. The table may contain different types of addresses. For example, some individuals may authorize a telephone number to be used for SMS communications of a particular purpose while others may authorize an email address for email communications of the particular purpose. The following is an example authorization table according to embodiments:

| User Name  | Email              | Phone Number    |
|------------|--------------------|-----------------|
| Scott Page | scott.page@abc.com | +61 144444444   |
| . . .      | . . .              | . . .           |

While the example table includes an entry with a name, email address, and phone number, as mentioned previously some entries may include only an email address or only a phone number. Further, some entries may include other types of addresses such as an address for social media communications.

The communication privacy system may access the authorization database to determine whether the addresses associated with the communication have been authorized for the classified purpose. For example, the communication privacy system may access a specific table in the authorization database that contains addresses that are authorized for the classified purpose and search the table for the addresses associated with the communication. In embodiments where a communication is classified with multiple purposes, the communication privacy system may access a table for each purpose and verify that the addresses associated with the communication are found in each table.

At operation 450, the communication privacy system may determine whether all the addresses associated with the communication have been authorized for the classified purpose. For example, the communication privacy system may determine whether each address associated with the communication was found in the authorization table associated with the classified purpose. In embodiments where a communication is classified with multiple purposes, the communication privacy system may determine whether the addresses associated with the communication have been authorized for each classified purpose.

If at operation 450 the communication privacy system determines that one or more addresses have not been authorized for the classified purpose, the system may prompt the sender of the communication to remove the unauthorized addresses. For example, the communication privacy system may instruct an email client to display a notification to a user. The prompt may include a listing of the unauthorized addresses with an instruction to remove the addresses and may indicate the classified purpose of the communication.

In some embodiments, the sender may be allowed to correct the classified purpose if they determine that it is incorrect. For example, a window containing the prompt may allow the user to remove one or more of the classified purposes, add additional purposes, and provide these corrected purposes to the communication privacy system. The window may also allow the user to indicate that the classified purpose is correct.

At operation 470, the communication privacy system may determine whether the sender indicated that the classification was incorrect. For example, the communication privacy system may determine whether a corrected purpose was received. If at operation 470 the communication privacy system determines that the classification was incorrect, the communication privacy system may update the artificial intelligence model based on the classification of purpose indicated by the sender. In some embodiments, the weights of the artificial neural network may be adjusted based on the sender-provided classification of the purpose. For example, the communication privacy system may update the weights of an RNN using backpropogation.

Further, in response to determining that the classification was incorrect, the communication privacy system may return to operation 440 and determine whether the addresses associated with the communication are authorized for the sender-classified purpose.

At operation 450, if all the addresses have been authorized for the classified purpose, at operation 490 the communication privacy system may proceed to the next operation. In some embodiments, the next operation may be another PI privacy verification such as operation 220 or operation 240 described in reference to FIG. 2. In some embodiments, the next operation may be allowing the electronic message to be sent to the recipients such as in operation 250 described in reference to FIG. 2.

Similarly, if at operation 470 the classification is correct, at operation 490 the communication privacy system may proceed to the next operation as described above.

Referring now to FIG. 5, a flowchart of an example method 500 for determining whether privacy rules of a different country or organization apply to an electronic communication is depicted. Method 400 may be performed by communication privacy system 110, and more country/organization module 140, described in reference to FIG. 1.

At operation 510, the countries and/or organizations associated with the recipients is determined. In some embodiments, the communication privacy system may maintain this information in a database such as country/organization database 170 or personal profile database 150 described in reference to FIG. 1. In some embodiments, the communication privacy system may search remote databases for the country/state information using the addresses associated with the communication. For example, the communication privacy system may search a company's public directory of employees for an email address of a recipient. In some embodiments, country or organization information may be determined based on the address itself. For example, a country may be determined based on the country code of a phone number, or an organization or country may be determined based on the domain of an email address.

At operation 520, the communication privacy system may determine whether a recipient is in a different country and/or organization than the sender. If at operation 520 the communication privacy system determines that one or more recipients are in different countries or organizations than the sender, at operation 530 the communication privacy system may check whether the recipients in different countries or organizations are in the same team or client as the sender. A sender may be authorized to send communications to individuals that are part of the same team or client. At operation 540, the communication privacy system may determine whether the recipients in different countries or organizations are in the same team or client.

If at operation 540, the communication privacy system determines that the recipients are in the same team or client, at operation 550 the communication privacy system may prompt the sender to check privacy rules or laws across the countries or organizations that are involved. In some embodiments, the communication privacy system may provide the sender relevant rules with the prompt. The rules may be based on laws and regulations in the respective countries. Applicable rules for each country or organization may be stored in a database such as country/organization database 170. The rules may be manually entered or may be generated automatically. Generating rules for countries automatically may include the following steps for each country in a list of countries:

1. Check that a rule exists against each other country in the list.
2. If a rule does not exist, use a web scraper on sites containing legal data on data privacy.
3. Perform mining on scraped text data for text relevant to specific countries.
4. Determine if the scraped text has high relevance.
5. If the text has high relevance, search for keywords identifying categories of data allowed.
6. Create a rule based on what categories are allowed between countries.

After prompting the sender, at operation 560 the communication privacy system may proceed to the next operation. In some embodiments, the next operation may be another PI privacy verification such as operation 220 or operation 230 described in reference to FIG. 2. In some embodiments, the next operation may be allowing the electronic message to be sent to the recipients such as in operation 250 described in reference to FIG. 2.

If at operation 520 none of the recipients are in a different country or organization, at operation 560 the communication privacy system may proceed to the next operation. If at operation 540 the recipients in different countries or organizations are in the same team or client as the sender, at operation 560 the communication privacy system may proceed to the next operation.

Figure 6:
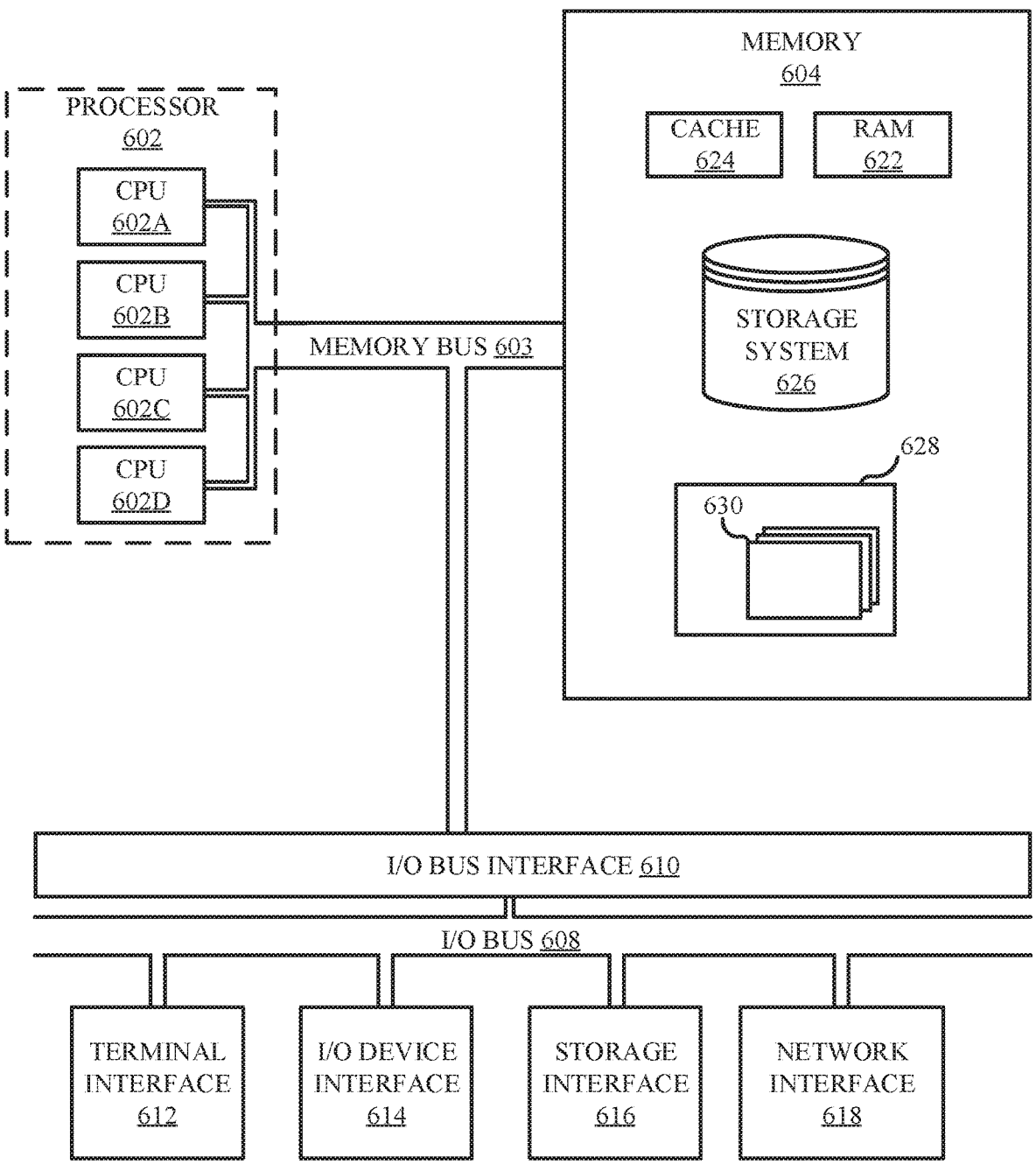
FIG. 6 depicts a block diagram of an example computer system according to embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
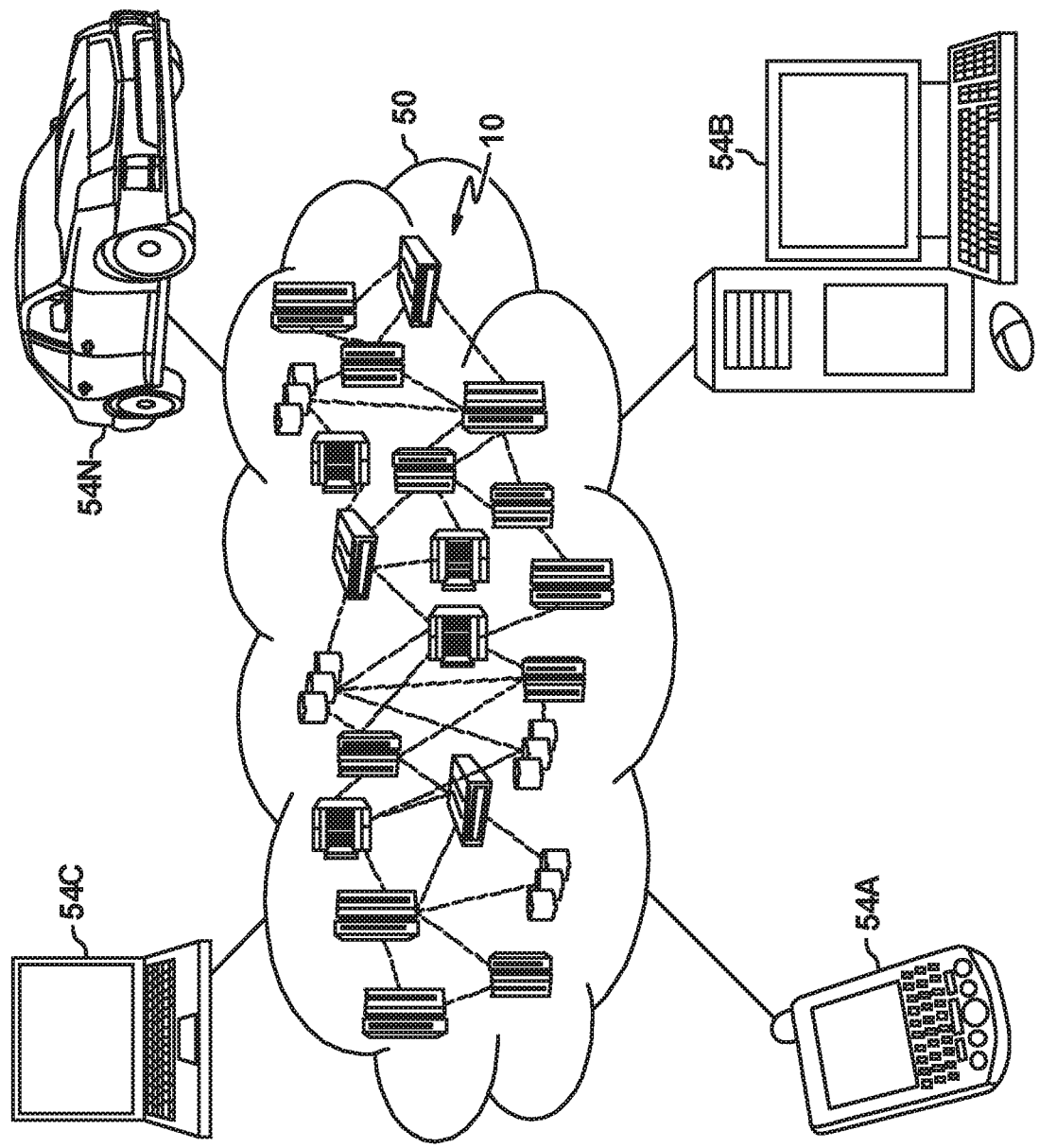
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
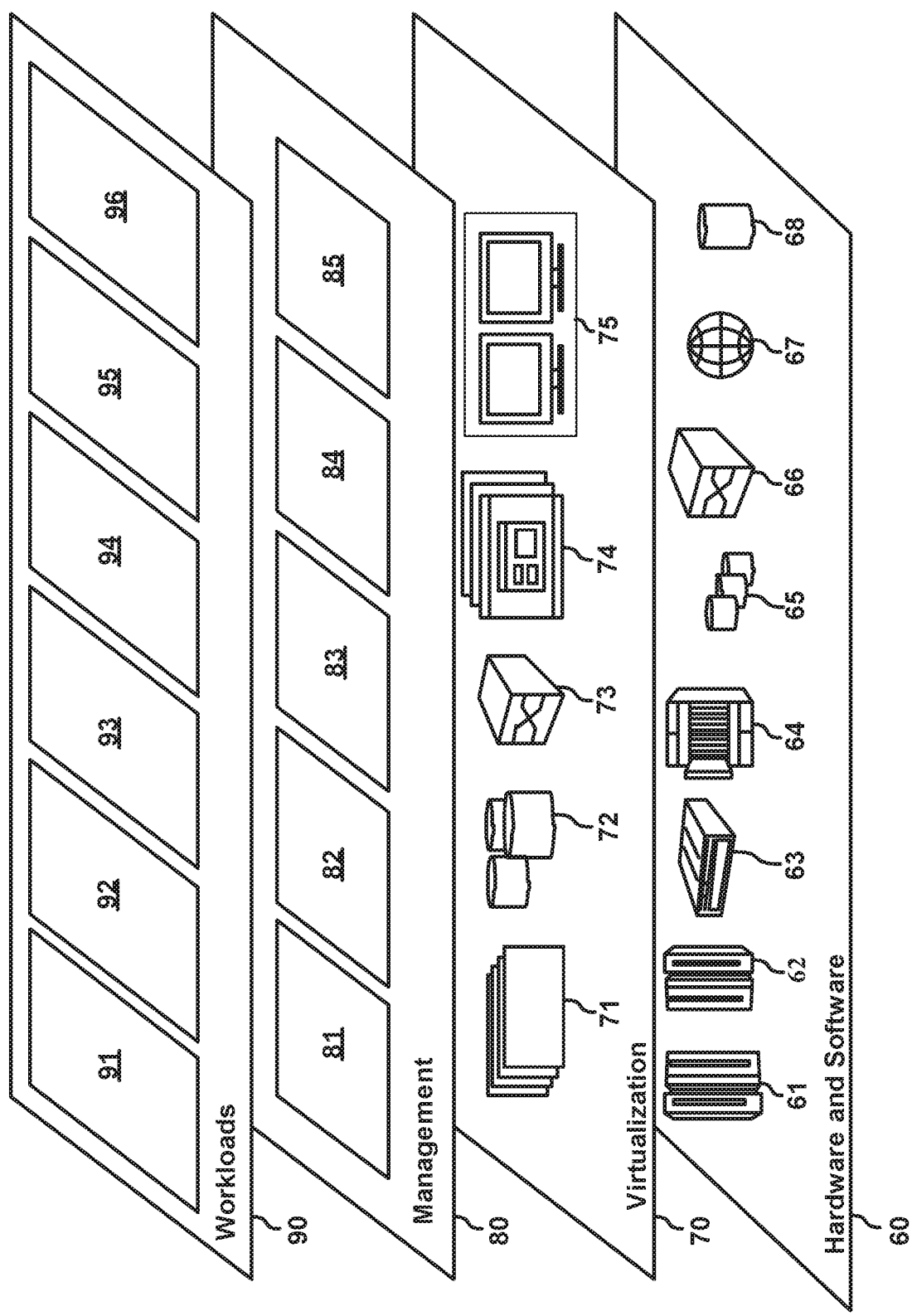
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication privacy 96.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving an electronic communication associated with a set of addresses;
analyzing the electronic communication using an artificial intelligence model to classify a purpose for the electronic communication;
determining, using an authorization database, whether each address in the set of addresses has been authorized for communication for the classified purpose; and
in response to determining at least one address has not been authorized for communication for the classified purpose, prompting a sender of the electronic communication to remove the at least one address.

2. The method of claim 1, wherein the artificial intelligence model is trained by supervised learning methods.

3. The method of claim 1, further comprising:
receiving from the sender a correction to the classified purpose; and
adjusting weights in the artificial intelligence model based on the correction.

4. The method of claim 1, further comprising:
identifying personal information in at least one of a subject or body of the electronic communication by comparing the subject and body of the electronic communication to profile information for one or more individuals associated with the set of addresses; and
in response to the identifying personal information, prompting the sender to remove the personal information.

5. The method of claim 1, further comprising:
determining that an address in the set of addresses is associated with a different country than the sender; and
in response to the determining that an address in the set of addresses is associated with a different country than the sender, prompting the sender regarding privacy laws in the one or more different countries.

6. The method of claim 1, wherein the electronic communication is an email.

7. The method of claim 1, wherein the electronic communication is an SMS message.

8. A system, comprising:
one or more processors; and
a computer readable storage medium, coupled to the one or more processors, storing program instructions that, when executed by the one or more processors, cause the one or more processors to perform operations comprising:
receiving an electronic communication associated with a set of addresses;
analyzing the electronic communication using an artificial intelligence model to classify a purpose for the electronic communication;
determining, using an authorization database, whether each address in the set of addresses has been authorized for communication for the classified purpose; and
in response to determining at least one address has not been authorized for communication for the classified purpose, prompting a sender of the electronic communication to remove the at least one address.

9. The system of claim 8, wherein the artificial intelligence model is trained by supervised learning methods.

10. The system of claim 8, wherein the operations further comprise:
   receiving from the sender a correction to the classified purpose; and
   adjusting weights in the artificial intelligence model based on the correction.

11. The system of claim 8, wherein the operations further comprise:
   identifying personal information in at least one of a subject or body of the electronic communication by comparing the subject and body of the electronic communication to profile information for one or more individuals associated with the set of addresses; and
   in response to the identifying personal information, prompting the sender to remove the personal information.

12. The system of claim 8, further comprising:
   determining that an address in the set of addresses is associated with a different country than the sender; and
   in response to the determining that an address in the set of addresses is associated with a different country than the sender, prompting the sender regarding privacy laws in the one or more different countries.

13. The system of claim 8, wherein the electronic communication is an email.

14. The system of claim 8, wherein the electronic communication is an SMS message.

15. A computer program product comprising a computer readable storage medium having program instructions embodied therewith, the program instructions being executable by one or more processors to cause the one or more processors to perform operations comprising:
   receiving an electronic communication associated with a set of addresses;
   analyzing the electronic communication using an artificial intelligence model to classify a purpose for the electronic communication;
   determining, using an authorization database, whether each address in the set of addresses has been authorized for communication for the classified purpose; and
   in response to determining at least one address has not been authorized for communication for the classified purpose, prompting a sender of the electronic communication to remove the at least one address.

16. The computer program product of claim 15, wherein the artificial intelligence model is trained by supervised learning methods.

17. The computer program product of claim 15, wherein the operations further comprise:
   receiving from the sender a correction to the classified purpose; and
   adjusting weights in the artificial intelligence model based on the correction.

18. The computer program product of claim 15, wherein the operations further comprise:
   identifying personal information in at least one of a subject or body of the electronic communication by comparing the subject and body of the electronic communication to profile information for one or more individuals associated with the set of addresses; and
   in response to the identifying personal information, prompting the sender to remove the personal information.

19. The computer program product of claim 15, further comprising:
   determining that an address in the set of addresses is associated with a different country than the sender; and
   in response to the determining that an address in the set of addresses is associated with a different country than the sender, prompting the sender regarding privacy laws in the one or more different countries.

20. The computer program product of claim 15, wherein the electronic communication is an email.

* * * * *